(12) United States Patent  
Guermont

(10) Patent No.: US 8,451,502 B2
(45) Date of Patent: May 28, 2013

(54) METHOD OF HALFTONING AN IMAGE

(75) Inventor: Jérôme O. R. Guermont, Gentilly (FR)

(73) Assignee: Oce Technologies B.V., Venlo (NL)

( * ) Notice: Subject to any disclaimer, the term of this patent is extended or adjusted under 35 U.S.C. 154(b) by 0 days.

(21) Appl. No.: 13/461,817

(22) Filed: May 2, 2012

(65) Prior Publication Data
US 2012/0229865 A1    Sep. 13, 2012

Related U.S. Application Data

(63) Continuation of application No. PCT/EP2010/066998, filed on Nov. 8, 2010.

(30) Foreign Application Priority Data

Nov. 16, 2009 (EP) .................................... 09306097

(51) Int. Cl.
H04N 1/405    (2006.01)
H04N 1/46    (2006.01)

(52) U.S. Cl.
USPC .......................................... 358/3.06; 358/534

(58) Field of Classification Search
USPC ................. 358/3.06, 3.11, 3.12, 3.13, 3.14, 358/1.9, 534; 345/596, 598; 347/131
See application file for complete search history.

(56) References Cited

U.S. PATENT DOCUMENTS

| 7,330,291 | B2 * | 2/2008 | Abe ............................ 358/3.06 |
| 8,248,433 | B2 * | 8/2012 | Young .......................... 345/598 |
| 2005/0219241 | A1 | 10/2005 | Chun |
| 2005/0230641 | A1 | 10/2005 | Chun et al. |
| 2006/0147109 | A1 | 7/2006 | Munsil et al. |
| 2007/0035752 | A1 | 2/2007 | Evans et al. |
| 2011/0116135 | A1 * | 5/2011 | Ernst et al. .................. 358/3.06 |

FOREIGN PATENT DOCUMENTS

EP    2 109 304 A1    10/2009

* cited by examiner

Primary Examiner — Charlotte M Baker
(74) Attorney, Agent, or Firm — Birch, Stewart, Kolasch & Birch, LLP

(57) ABSTRACT

A method of halftoning an image wherein a source file that represents the image in the form of a first pixel array, in which at least one input color value that is given by a first number of bits is assigned to each pixel, is electronically processed to compute an output file in the form of a second pixel array in which at least one output color value that is given by a second number of bits, said second number being smaller than the first number, is assigned to each pixel of the second pixel array, wherein the processing is performed in a Graphics Processing Unit (GPU).

14 Claims, 9 Drawing Sheets $$\begin{pmatrix} R(ix,iy) \\ G(ix,iy) \\ B(ix,iy) \end{pmatrix} = \begin{pmatrix} texi(x+2,y) \\ texi(x+1,y) \\ texi(x,y) \end{pmatrix} \qquad (II)$$

*Fig. 11*

$$\begin{pmatrix} HC(ix,iy) \\ HM(ix,iy) \\ HY(ix,iy) \\ HK(ix,iy) \end{pmatrix} = \begin{pmatrix} 3 \\ 3 \\ 3 \\ 3 \end{pmatrix} - step\left(\begin{pmatrix} C(ix,iy) \\ M(ix,iy) \\ Y(ix,iy) \\ K(ix,iy) \end{pmatrix}, \begin{pmatrix} TC1 \\ TM1 \\ TY1 \\ TK1 \end{pmatrix}\right)$$

$$- step\left(\begin{pmatrix} C(ix,iy) \\ M(ix,iy) \\ Y(ix,iy) \\ K(ix,iy) \end{pmatrix}, \begin{pmatrix} TC2 \\ TM2 \\ TY2 \\ TK2 \end{pmatrix}\right)$$

$$- step\left(\begin{pmatrix} C(ix,iy) \\ M(ix,iy) \\ Y(ix,iy) \\ K(ix,iy) \end{pmatrix}, \begin{pmatrix} TC3 \\ TM3 \\ TY3 \\ TK3 \end{pmatrix}\right)$$

*Fig. 12*

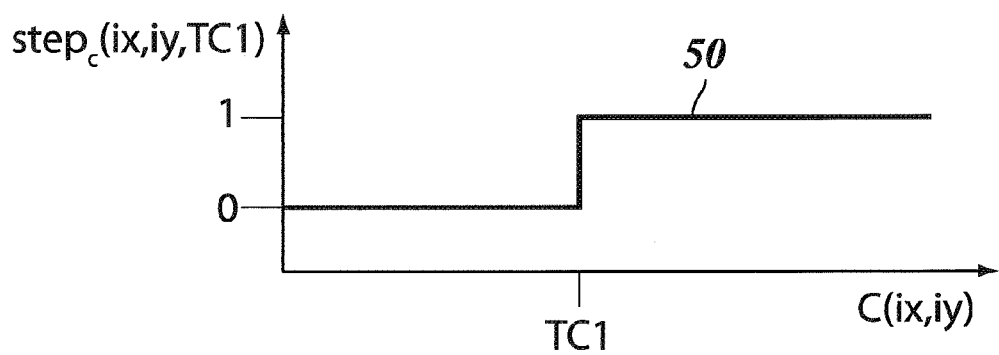

METHOD OF HALFTONING AN IMAGE

This application is Continuation of PCT International Application No. PCT/EP2010/066998 filed on Nov. 8, 2010, which claims priority under 35 U.S.C §119(a) to Patent Application No. 09306097.8 filed in Europe on Nov. 16, 2009, all of which are hereby expressly incorporated by reference into the present application.

The invention relates to a method of halftoning an image, wherein a source file that represents the image in the form of a first pixel array, in which at least one input colour value that is given by a first number of bits is assigned to each pixel, is electronically processed to compute an output file in the form of a second pixel array in which at least one output colour value that is given by a second number of bits, said second number being smaller than the first number, is assigned to each pixel of the second pixel array.

In the art of digital image processing and printing, an image is frequently represented in the form of an electronic raster image file. The raster image is divided into a plurality of rows and columns of pixels and takes the form of a pixel array wherein one or more values indicating the brightness or colour are assigned to each individual pixel. In a black and white image, there is only a single colour (black), and the "colour" values assigned to the individual pixels indicate the grey levels of the respective pixels. For example an 8-bit colour value can define 256 different grey levels ranging from 0 (white) to 255 (black). In a colour image, each pixel has typically three to four colour values assigned to it, e.g. for the colours Red (R), Green (G) and Blue (B) in the RGB system or Cyan (C), Magenta (M), Yellow (Y) and Black (K) in the CMYK colour system. In an image that has been created on a computer or has been scanned-in with a scanner, each colour value may again have 8 bits, for example.

However, most digital printers are not capable of directly converting 256 different grey levels or colour levels into printed dots with a corresponding number of different sizes or density levels. Many printers are only capable of either printing or not printing a dot with fixed size and density. Other printers are capable of producing dots with a small number, e.g. four, different sizes or densities per pixel and colour. If, for example, the printer is capable of producing three different dot sizes, then the image should be presented to the printer in the form of a pixel array wherein each colour value has not more than 2 bits.

Consequently, a process is needed that reduces the number of bits per colour value, e.g. from 8 to 2, while preserving the optical impression of the printed image as far as possible. This process is called "halftoning" or "multi-level halftoning" if the reduced number of bits is larger than 1.

Known halftoning algorithms typically include a thresholding step wherein the colour values of the pixels of the source image are compared to a threshold value or a set of threshold values. For example, a colour value may be compared to three different threshold values, and the resulting colour value will be 0, 1, 2 or 3, depending upon how many threshold values have been exceeded.

Even when the colour values in the second pixel array that is obtained by halftone processing have only a small number of e.g. 2 bits, representing four different density values, is it possible to create a larger number of different density values in the printed image. This can be achieved by arranging the colour values in the second pixel array in such a manner that the combined effect of adjacent pixels having different colour values leads to a visual impression that corresponds to an intermediate density level. In general, the resolution of a halftone image obtained in this way will be smaller than the resolution of the source image.

A typical example of such a halftoning process is the so-called dithering method, wherein the colour values of the source image are compared to matrix elements of a threshold matrix (dither matrix) that covers a number of adjacent pixels. As a result, even for an area of the source image with uniform density, the halftone-processed 2-bit colour values will show a certain spread, depending on the distribution of threshold values in the matrix.

Another example of a known halftoning process is the so-called error diffusion, wherein the (8-bit) colour value of the source image is approximated by a 2-bit output colour value, for example, and the error is compensated by suitably computing the output colour value of neighboring pixels.

In conventional printers, the halftone processing is done in a Central Processing Unit (CPU) in a so-called front end of the printer. However, halftoning is a process that requires a considerable amount of processing power and time, especially for large format colour images. Several techniques are known for speeding-up the halftone processing in a CPU, but these techniques are generally dependent on certain properties of the source image, so that the extent to which the halftone processing can be accelerated, depends on the specific image to be processed. As a result, it is difficult to estimate the required processing time beforehand, as would be desirable for scheduling the overall operation of the printer.

It is an object of the invention to provide a halftoning method which can be executed within a shorter and/or more predictable processing time.

In order to achieve this object, the method according to the invention is characterised in that the processing is performed in a Graphics Processing Unit (GPU).

Today, GPUs are used in computer systems for rendering images to be displayed on a screen. The technology of GPUs has experienced a fast progress, driven mainly by the entertainment industry, so that commercially available GPUs are relatively cheap and nevertheless very powerful in processing large amounts of data as is necessary for image processing. In particular, GPUs have a highly parallel architecture, so that a large number of threads can be processed in parallel. Typical tasks of the GPU comprise coordinate transformations, e.g. for displaying a scene from different perspectives, pixel shading, e.g. for rendering illumination effects, and the like.

Although these tasks are quite different from the tasks encountered in a halftoning process, it turns out that the available GPUs can be programmed to perform these tasks as well in a very efficient manner.

It is a precondition for parallel processing that the threads are independent from one another in the sense that one thread does not depend on results to be obtained in another thread that is processed simultaneously. In a halftoning process based on error diffusion, where the propagation of the error can generally be limited to the immediate neighborhood of a pixel, this condition will at least be fulfilled for pixels that are separated by a sufficient distance. In a halftoning process that is based on threshold matrices, the threads processing different pixels will be independent from one another in this sense, so that the amount of parallelism will only be limited by the capabilities of the GPU. In any case, when the total number of pixels of an image and the capacity of the GPU are known, it will always be possible to estimate the time that will be needed for halftone processing, irrespective of the contents of the image to be processed.

The invention also relates to a printer and a computer program product implementing the method according to the invention.

More specific optional features of the invention are indicated in the dependent claims.

Preferred embodiments will now be described in conjunction with the drawings, wherein:

FIG. 11 illustrates a thresholding step performed in the kernel; and

FIG. 12 illustrates a step function that is used in the thresholding step.

Figure 1:
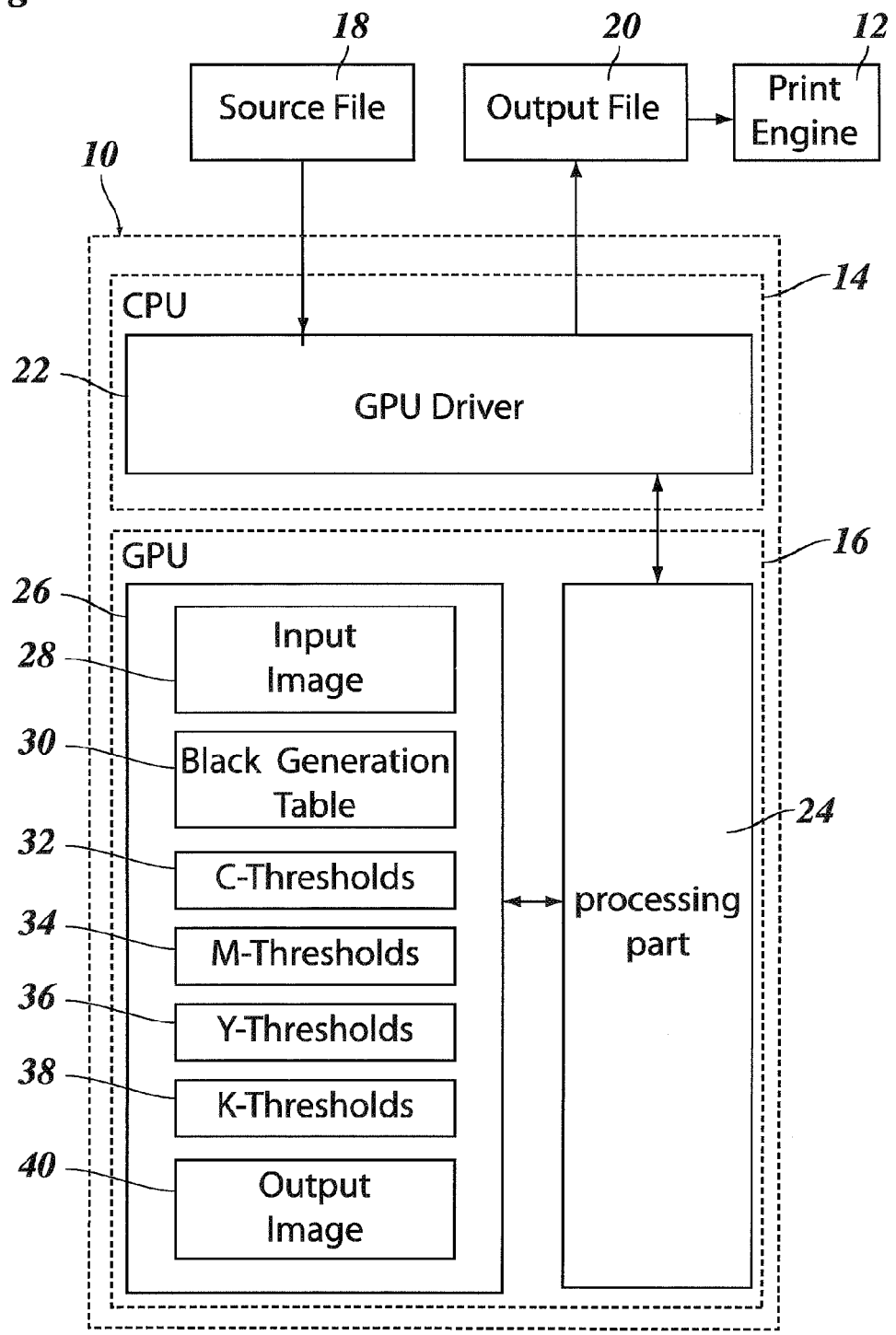
FIG. 1 is a block diagram of a printer adapted to perform the method according to the invention.

The printer that has schematically been illustrated in FIG. 1 comprises a front end 10 and a print engine 12. The front end 10 has the task of transforming electronic print data that are supplied to the printer into a format suitable to be printed with the print engine 12. As is generally known in the art, the front end 10 comprises a CPU 14, as well as memory space for storing program code and data, and further comprises input and control means, neither of which have been shown here.

In the shown embodiment, the front end 10 comprises a Graphics Processing Unit (GPU) 16 of a type that is typically used in modern personal computers, game consoles or workstations for rendering images on a display screen. The GPU 16 may be formed by a separate integrated circuit or may be integrated with the CPU 14 and other circuits and memory on the same substrate.

FIG. 1 further shows a source file 18 including image data that are received in and processed by the front end 10. By way of example, it is assumed that the image encoded in the source file is a colour image, and the colours are specified in a commonly used colour space such as RGB or CMYK. The colour space of the source file may be different from the colour space that is used by the printer. Then, the front end 10 may perform a suitable colour management algorithm for adapting the colour space of the source file 18 to that of the print engine 12, as has been described for example in European Patent Application No. 08 154 135.

By way of example, it shall be assumed here that the colour of each pixel in the source file 18 is defined by three or four colour values which each have a width of 8 bits. A multi-level halftone process shall be applied for converting the pixel array that is represented by the source file into a pixel array wherein the colour of each pixel is defined by four colour values C, M, Y, K, which each have the width of only 2 bits. Thus, each colour value may assume four different levels which the print engine 12 is able to reproduce. The result of this process is an output file 20 that may be sent to the print engine 12.

In the example that will be described here, a thresholding algorithm is used for halftoning. Further, in order to simplify the explanation, it shall be assumed that the pixel arrays represented by the source file 18 and the output file 20 are of identical shape and size, so that there exists a one-to-one correspondence between the pixels of the source file and the pixels of the output file, and each pixel of the source file is compared to a threshold value given in a threshold matrix that covers a certain area of the pixel array.

For the purpose of halftoning, the CPU 14 runs a specific software that is called GPU processing driver 22 and sets the parameters for the GPU 16 and then calls a so-called kernel, i.e. a program that is performed by the GPU 16. A processing part 24 of the GPU 16 includes a number of multi-processors that will apply the instructions specified in the kernel simultaneously to a large number of data objects which, in the present case, include the data of individual pixels of the source file, so that all or at least a large number of pixels of the source file are processed in parallel threads.

The GPU 16 further includes a memory part 26 that may be configured to accommodate a number of fixed memories, i.e. memories of fixed size that are used for storing so-called textures. A texture is a one-, two-, or three-dimensional data array similar to data arrays processed on the CPU, but with the particular feature that the elements of the data array may be addressed by floating-point indices. This is possible because the processor part 24 provides powerful processes for interpolating between the discrete data stored in the texture.

In the example shown, the textures comprise an input texture 28 storing the input image (input pixel array) as represented by the source file, a black generation table 30 that is needed for converting RGB colours into CMYK colours, four threshold textures 32, 34, 36, 38, one for each of the four colours C, M, Y, K, and optionally an output texture 40 for buffering the output pixel array before the same is transferred to the system memory of the front end as the output file 20. As an alternative, the kernel may directly return the results to the system memory so as to create the output file. Preferably, Direct Memory Access (DMA) is used for accelerating download and upload procedures.

The function of the GPU processing driver 22 will now be explained with reference to FIG. 2.

Figure 3:
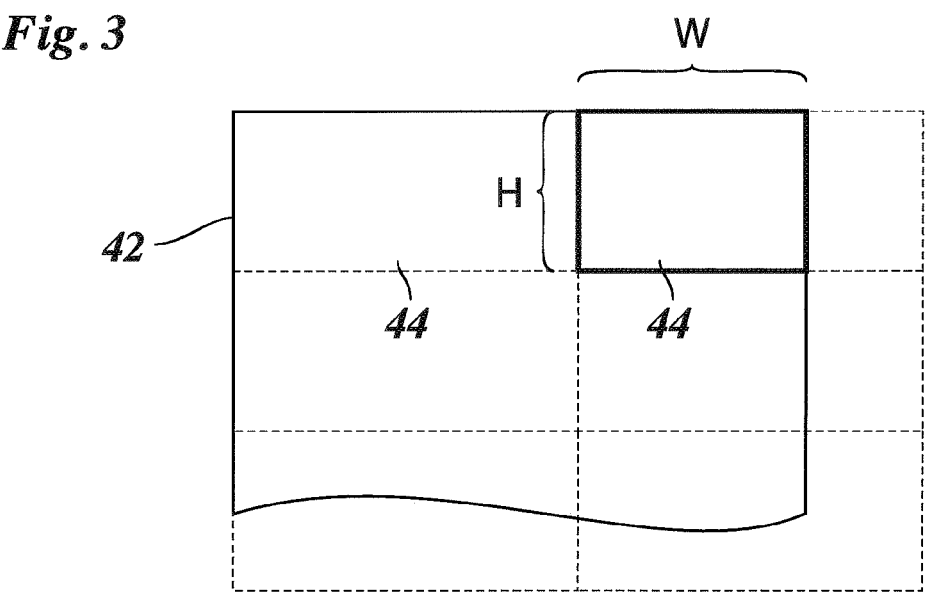
FIG. 3 is a diagram illustrating a tiling procedure.

In a first step S1, the driver checks the size of the source image to be processed and decides whether the capacity of the GPU 16, especially the storage capacity, is large enough to process the entire image in one batch. If not, the image is divided into a plurality of tiles that will then be processed by the GPU 16 one after the other. FIG. 3 illustrates a portion of a pixel array 42 that represents the entire image and is divided into a number of tiles 44, each tile having a certain width W and a certain height H.

In step S2, the driver sets a number of parameters for the GPU 16. This includes for example identifying the colour system used in the source file 18 and setting the GPU to that colour system, specifying an undercolour removal (UCR) factor for the conversion from RGB colours into CMYK colours, specifying the textures and their sizes and addressing types, and the like.

In step S3, the data arrays which contain the data of the source file, the threshold matrices and the black generation table are bound to the corresponding textures 28-38, so that the data may readily be uploaded to the textures in the GPU.

In step S4, a block size is defined by indicating the numbers of pixels of a block in x-direction and y-direction of the pixel array. The concept of a block relates to the memory hierarchy in the GPU 16. Each thread has a private local memory, a shared memory that is visible to all threads in the same block, and a global memory. The block size is selected in view of optimal usage of the available memory and optimal memory access for the threads. The blocks are arranged in a grid extending in x- and y-direction.

In step S5, the grid size, i.e. the number of blocks in x-direction and y-direction, is calculated on the basis of width W and the height H of the tile 44 and the block size defined in step S4, so that the grid covers the entire tile.

Figure 4:
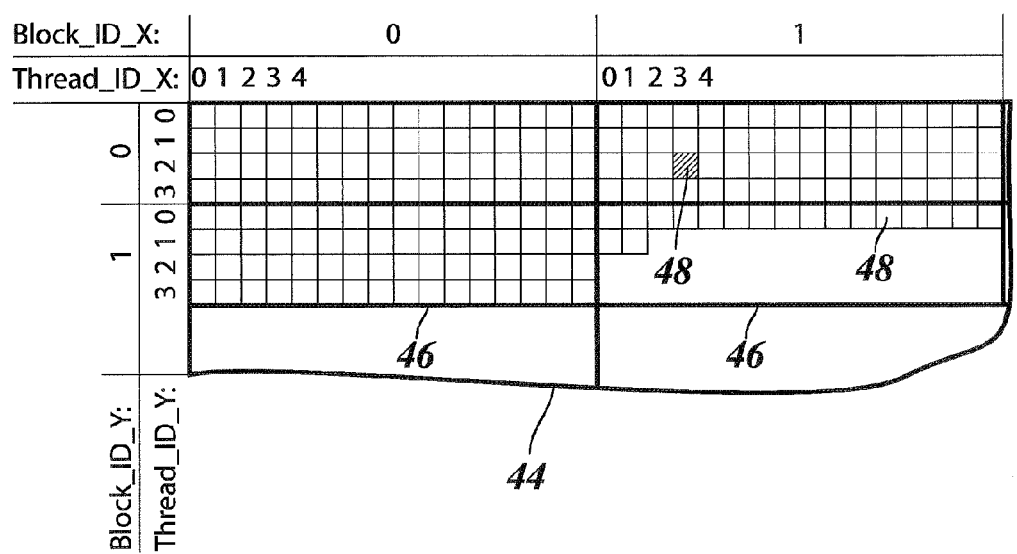
FIG. 4 is a diagram illustrating the structure of parallel processing of the pixels of a tile in a GPU.

FIG. 4 shows the top left corner of a tile 44 with an overlaid grid of blocks 46. In this example, the block size is 16×4. Each block 46 is identified by a pair of IDs (Block_ID_X, Block_ID_Y). Similarly, a thread 48 within a block is identified by a pair of thread-IDs (Thread_ID_X, Thread_ID_Y) Thus, for example, the thread 48 that has been shown hatched in FIG. 4 is identified by Block_ID_X=1, Block_ID_Y=0, Thread ID_X=3 and Thread_ID_Y=2.

Figure 2:
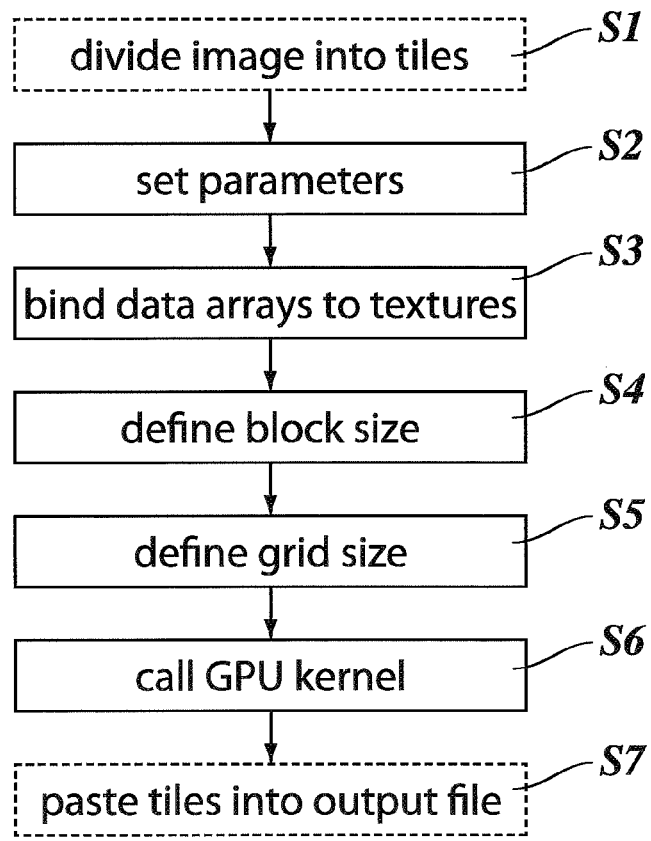
FIG. 2 is a flow diagram of a GPU processing driver that runs on a CPU of the printer.

The next step in FIG. 2 is step S6, where the GPU-kernel is called and executed, as will be explained below in conjunction with FIG. 5.

If the entire image had been divided into tiles, so that step S6 results only in a single halftone-processed tile of the image, then step S6 is followed by step S7 where the result returned by the kernel is pasted into the output file 20 in the correct tile position, so that the entire output image will be completed as soon as all tiles have been processed in the way shown in FIG. 2.

Figure 5:
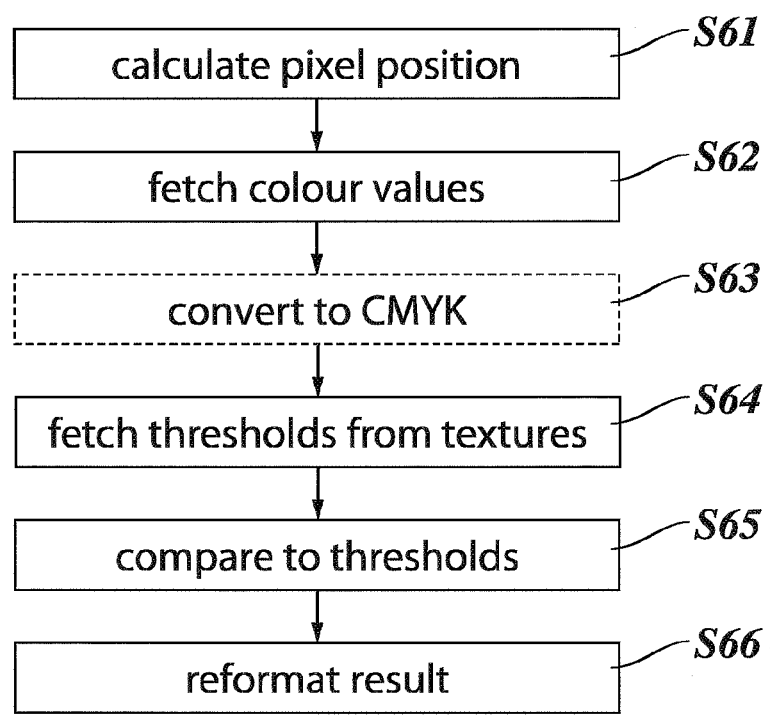
FIG. 5 is a flow diagram of a kernel that runs on the GPU.

FIG. 5 shows the essential steps of the kernel that is called in step S6 and is executed by the GPU 16. The operations shown in FIG. 5 apply to as many threads as the GPU 16 can process simultaneously, ideally to all the threads (i.e. all the pixels) of the tile 44.

Step S61 serves for calculating a pixel position (ix, iy) relative to the tile 44 and a coordinate position (x, y) in the input texture 28. The pixel position (ix, iy) is given by integral numbers and is calculated as follows:

$$ix = Block\_ID\_X * Block\_Size\_X + Thread\_ID\_X$$

$$iy = Block\_ID\_Y * Block\_Size\_Y + Thread\_ID\_Y$$

wherein Block_Size_X and Block_Size_Y are the dimensions of the block 46 in x- and y-direction. Thus, for the hatched pixel 48 in FIG. 4, the result would be: ix=1*16+3=19, and iy=0*4+2=2. As can be seen in FIG. 4, (ix, iy) indicates the position of the pixel or thread by counting the pixels from the top left corner of the tile.

The calculation of the coordinates of the pixel relative to the input texture 28 depends upon the colour system of the source file and on the way how the colour values are organized in the input texture 28.

Figure 6:
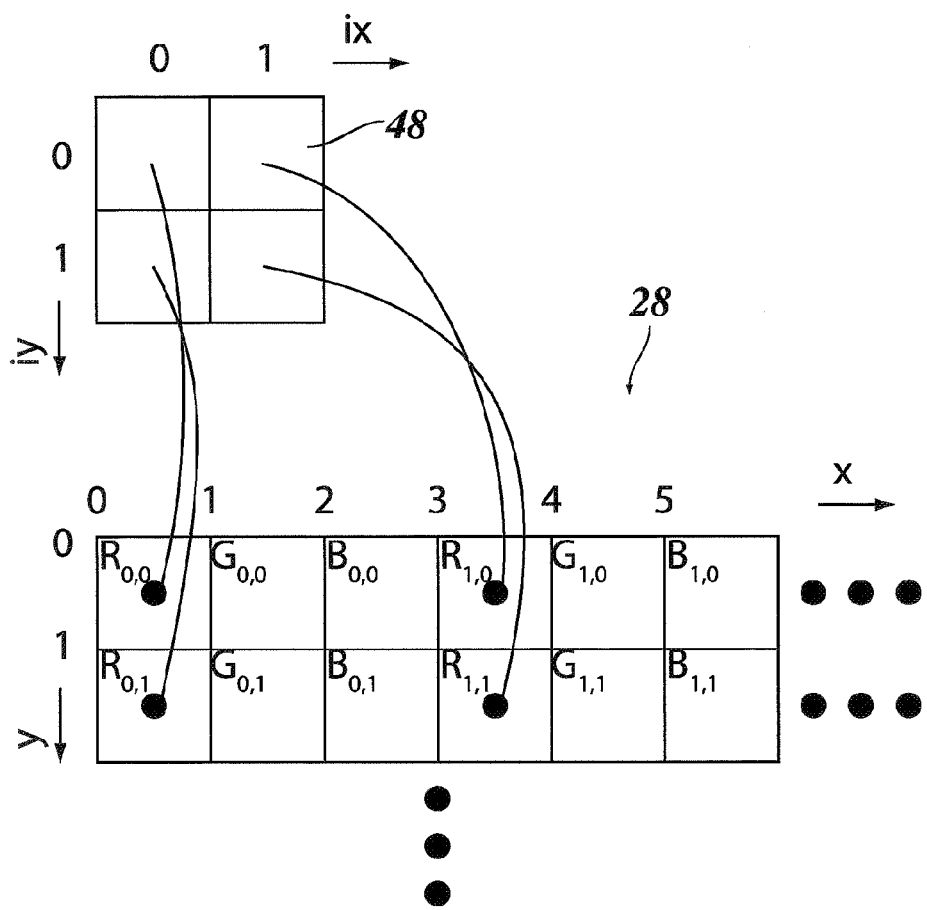
FIGS. 6 to 8 are diagrams illustrating a step of fetching colour values from a texture, for three different types of input data.

FIG. 6 shows a portion of the input texture 28 loaded with image data in the RGB colour system. The colour values $R_{0,0}$, $G_{0,0}$ and $B_{0,0}$ for the pixel position ix=0 and iy=0 occupy the first three x-coordinate positions 0, 1, and 2 in line 0 (i.e. y-coordinate position 0). Likewise, the three colour values of all the other pixels are given in three adjacent coordinate positions in x-direction. FIG. 6 further illustrates how the threads with the pixel positions (ix, iy) are mapped onto the texture coordinates (x, y):

$$x = 3 * ix + 0.5$$

$$y = iy + 0.5.$$

The addition of "0.5" assures that the data will be sampled from the centre of the respective cell in the texture.

In step S62 in FIG. 5, the colour values are fetched from the input texture 28, as is shown for example by equation (I) in FIG. 6. In this equation, texi(x, y) is a function that fetches the colour value from the coordinate position (x, y) in the input texture 28. The three colour values (R, G, B) form a 3-vector the components of which are read from the coordinate positions x, x+1 and x+2, respectively in the input texture 28.

Figure 7:
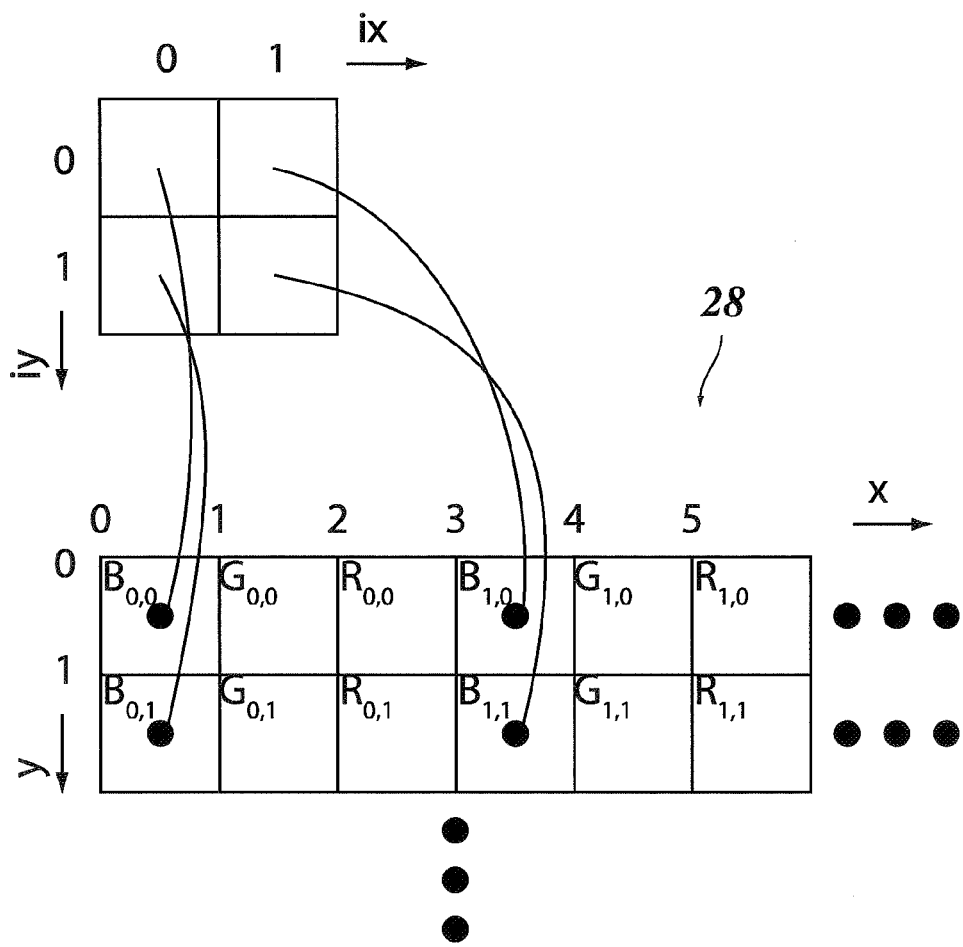

FIG. 7 is a diagram analogous to FIG. 6 and illustrates the case that the data in the input texture 28 are in the BGR colour system, another system that is frequently used in image processing. In this case, the colour values $B_{0,0}$, $G_{0,0}$, $R_{0,0}$ for each pixel are written in reverse order in three neighbouring x-coordinate positions of the input texture. When the data are read from the texture in step S62, they are converted to the RGB system by reversing the order in which the components of the vector (R, G, B) are read from the x-coordinate positions, as is shown in equation (II) in FIG. 7.

Figure 8:
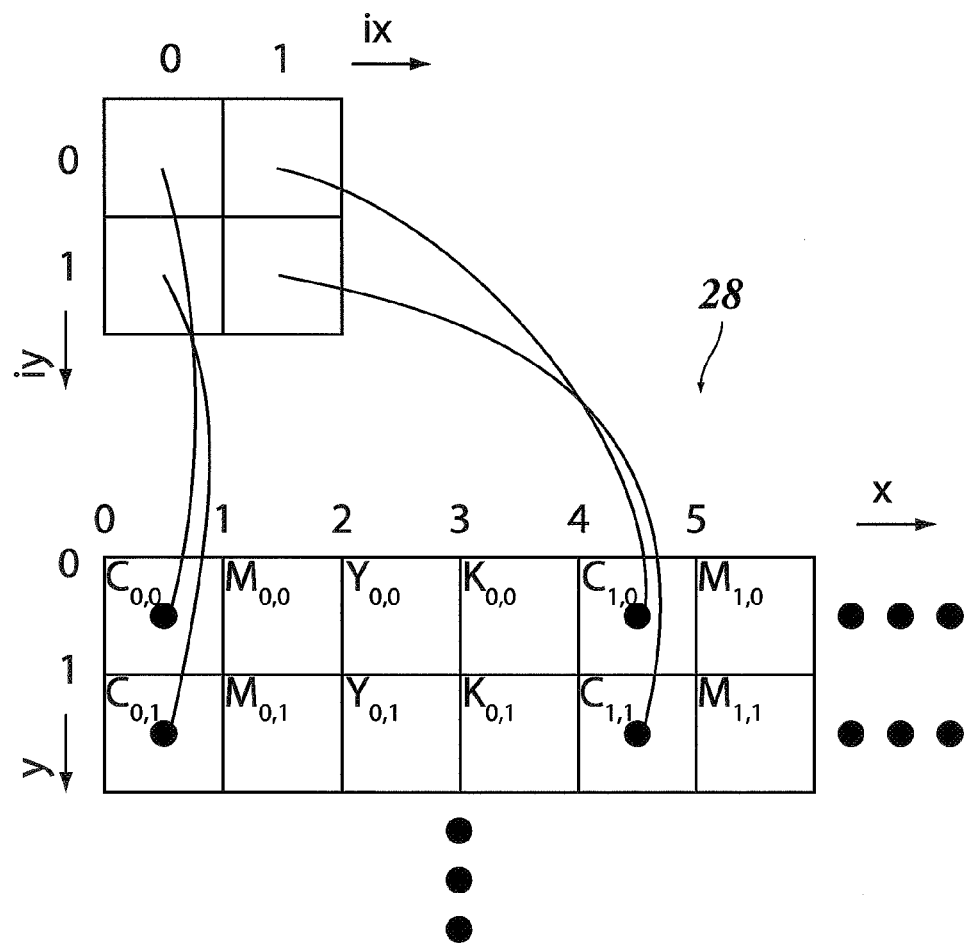

FIG. 8 illustrates the case that the data in the input texture 28 are in the CMYK colour system. In this case, the texture is spread in x-direction by a factor 4 so as to accommodate the four colour values C, M, Y and K per pixel. Accordingly, the colour values form a 4-vector (C, M, Y, K) that is read from the texture as is indicated by equation (III) in FIG. 8.

If the data in the input texture 28 are in the RGB or BGR colour system, it is necessary to convert them into the CMYK system in step S63 in FIG. 5. This conversion is performed in a well-known manner. For example, if the colour values are given by 8-bit words, then, in order to obtain the cyan colour value C, it is necessary to subtract B from the maximum value 255. The colour values M and Y are calculated from their respective complementary colours in the same way. All these subtractions can be made in a single vector operation. Then, the minimum of the three components of the resulting vector (C, M, Y) is searched for obtaining a grey value of the pixel. The corresponding K-value (black) is then looked-up in the black generation texture 30. Finally, the colour values C, M and Y are reduced by a certain percentage (UCR-factor) of the K-value (undercolour removal). In equation (VI) in FIG. 6, these operations have been summarized by a function f that is applied to the vector (R, G, B) to yield the vector (C, M, Y, K), wherein the function f has the UCR-factor as another argument and has bound-in the black generation texture 30.

The same conversion is also performed when the source data are in the BGR system as in FIG. 7, whereas, when the data are in the CMYK system already (FIG. 8), no conversion is necessary.

Figure 9:
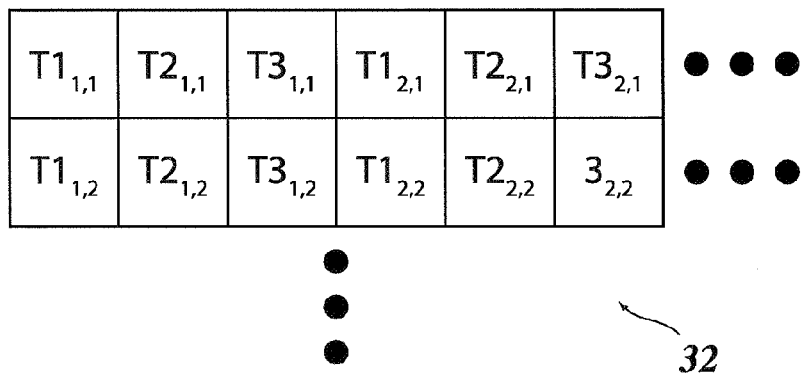
FIG. 9 illustrates a texture that contains a multi-threshold matrix.

In step S64 in FIG. 5, the threshold values are fetched from the threshold textures 32-38 so as to be compared to the CMYK colour values of the pixel. FIG. 9 shows the top left corner of one of the threshold textures, e.g. the threshold texture 32 for cyan. Similarly as in FIGS. 6 and 7, the texture is spread by a factor 3 in x-direction so as to accommodate three threshold values T1, T2 and T3 per pixel. Thus, the threshold textures can be addressed by the same coordinates (x, y) that have been used in FIGS. 6 and 7 for addressing the input texture 28.

Figure 10:
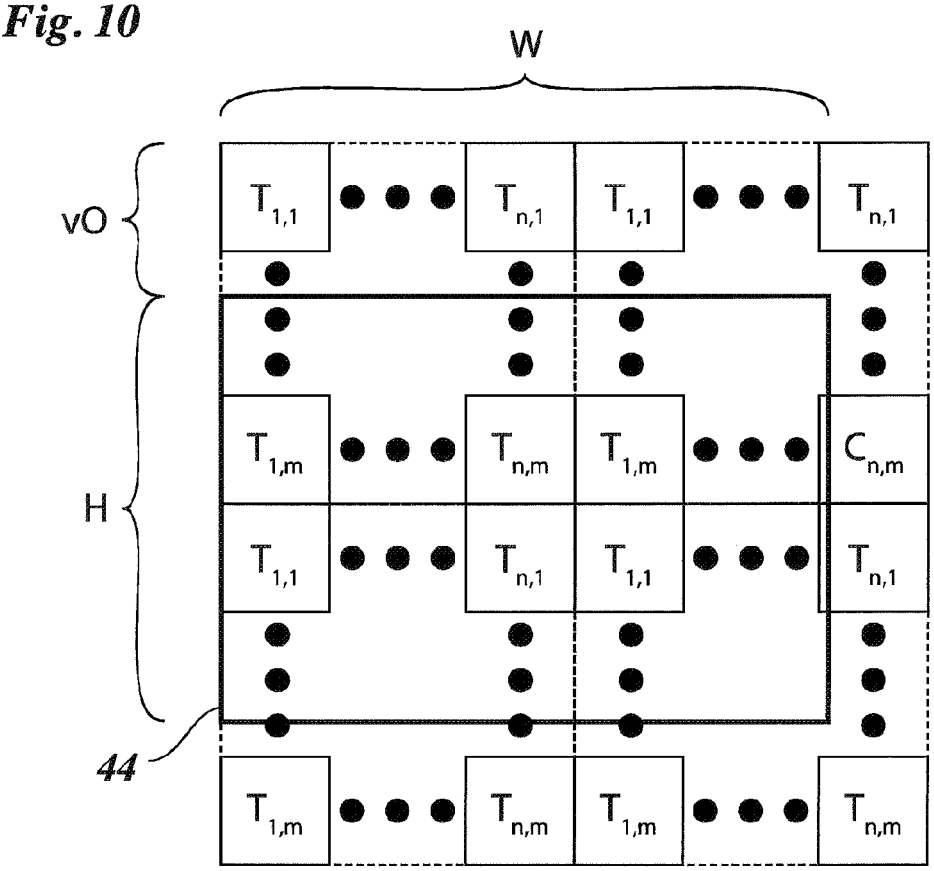
FIG. 10 illustrates a scheme for tiling the image with threshold matrices.

The size of the threshold textures 32-38 is however smaller than the size of the input texture 28 because the threshold textures represent threshold matrices that cover only a small portion (a macro pixel) of the entire image or tile. More precisely, each threshold texture represents three thresholds matrices or a single threshold matrix with three layers (indicating the threshold values T1, T2 and T3, respectively). As is shown in FIG. 10, the tile 44 is completely covered by a repetitive pattern made up of copies of the threshold matrices. In FIG. 10, the matrix elements have been indicated as "$T_{1,1}$, ... $T_{n,1}$, ... $T_{1,m}$", "$T_{n,m}$", wherein "T" stands for any of the threshold values or layers T1, T2 or T3 shown in FIG. 9. The repetitive pattern can be created by taking the ix- and iy-coordinates of the pixel modulo the size of the result matrix in the respective direction and then using the result for addressing the texture matrices 32-38. In case of the y-coordinate, a certain vertical offset vO may be added so as to shift the pattern of the threshold matrices relative to the tile 44, as has been shown in FIG. 10.

In order to fetch the three threshold values T1, T2 and T3 for the pixel to be processed, the threshold texture is read at the x-coordinate positions x, x+1 and x+2, similarly as has been described in conjunction with FIG. 6.

All four threshold textures 32-38 can be addressed in the same way, so that step S64 finally yields three 4-vectors (TC1, TM1, TY1, TK1), (TC2, TM2, TY2, TK2), (TC3, TM3, TY3, TK3) indicating three threshold values for each colour component.

In step S65 in FIG. 5, the CMYK colour values of the pixel are compared to the threshold values so as to obtain halftoned output colour values that form a 4-vector (HC, HM, HY, HK) the components of which have only one of four possible values "0", "1", "2" and "3". The calculation is shown in FIGS. 11 and 12. According to FIG. 11, the calculation starts with a 4-vector (3, 3, 3, 3) and then subtracts therefrom the results of a (4-vector-) step function "step" applied to the vectors (C, M, Y, K) and (TC1, TM1, TY1, TK1), to (C, M, Y, K) and (TC2, TM2, TY2, TK2), and to (C, M, Y, K) and (TC3, TM3, TY3, TK3), respectively.

The effect of the step function has been illustrated FIG. 12. The step-shaped graph 50 illustrates, how the result of the function (only the C-component has been shown in this example) depends upon the colour value C for the pixel position (ix, iy). As can been seen, the function makes a step from the value "0" to the value "1" at a position indicated by the threshold value TC1. The M-, Y- and K-components of the step function are constructed in an analogous way.

Thus, the components of the output of each step function have either the value "0" or "1" depending upon whether or not the corresponding colour value is larger than the threshold value. Thus, the three subtraction steps shown in FIG. 11 have the effect that the components "3" of the start vector (3, 3, 3, 3) may or may not be reduced by one in each subtraction step, so that the result will be one of the values "0", "1", "2" and "3". Consequently, the vector (HC, HM, HY, HK) is a three-level halftone vector that is obtained as a result of the halftone process for each pixel within the tile 44 (pixel positions for which ix is larger than W or iy is larger than H are not evaluated).

The components of the vector (HC, HM, HY, HK) obtained in step S65 are still floating point values. This is why a final step S66 (FIG. 5) is applied for reformatting the result, i.e. for contracting the four output colour values into a single 8-bit word, wherein the first two bits indicate the K-value (either "0", "1", "2" or "3"), the next two bits indicate the C-value, the next two bits indicate the M-value and the last two bits indicate the Y-value. In this format, the result per pixel may be downloaded into the output file 20.

In the example that has been described above, it has been assumed, that each pixel in the input pixel array is directly compared to a corresponding set of threshold values. In a modified embodiment, it may however be possible, to apply additional operations to the pixels in the input texture. For example, the colour values may be averaged over a macro-pixel, so that only the average needs to be compared to the threshold values. Such an averaging procedure can easily be performed on the GPU 16, especially when the macro pixels and the blocks are defined such that the treads belonging to the same macro pixel will also belong to the same block.

The invention claimed is:

1. A method of halftoning an image wherein a source file that represents the image in the form of a first pixel array, in which at least one input colour value that is given by a first number of bits is assigned to each pixel, is electronically processed to compute an output file in the form of a second pixel array in which at least one output colour value that is given by a second number of bits, said second number being smaller than the first number, is assigned to each pixel of the second pixel array, wherein the processing is performed in a Graphics Processing Unit (GPU), wherein the first pixel array is loaded into a two-dimensional input texture in the GPU, and wherein a plurality of colour values are assigned to each pixel in the first pixel array, and, in order to accommodate the colour values in the input texture, this texture is expanded in one dimension by a factor corresponding to the number of colour values per pixel, and the colour values are written to adjacent coordinate positions of the input texture.

2. A digital printer comprising a front end and a print engine, wherein the front end is configured to carry out the method according to claim 1.

3. A computer program product embodied on a non-transitory computer readable memory and including program code that, when run on a data processing system having a CPU and a GPU, causes the CPU and the GPU to carry out the method according to claim 1.

4. The method according to claim 1, comprising a step of converting the colour values from one colour system to another colour system, said step being performed in the GPU.

5. The method according to claim 4, wherein the method of halftoning the image includes at least one threshold comparison per pixel.

6. The method according to claim 1, wherein the method of halftoning the image includes at least one threshold comparison per pixel.

7. The method according to claim 6, wherein at least one threshold matrix is loaded into a threshold texture of the GPU.

8. A method of halftoning an image wherein a source file that represents the image in the form of a first pixel array, in which at least one input colour value that is given by a first number of bits is assigned to each pixel, is electronically processed to compute an output file in the form of a second pixel array in which at least one output colour value that is given by a second number of bits, said second number being smaller than the first number, is assigned to each pixel of the second pixel array, wherein the processing is performed in a Graphics Processing Unit (GPU), wherein the method of halftoning the image includes at least one threshold comparison per pixel, wherein at least one threshold matrix is loaded into a threshold texture of the GPU, and wherein the threshold matrix includes more than one threshold value per pixel.

9. The method according to claim 8, wherein the number of threshold values per pixel corresponds to the number of colour values per pixel in at least one colour system, and the threshold values are arranged in the threshold matrix in the same pattern as the colour values are arranged in the input texture, so that the same address coordinates may be used for fetching the colour values from the input texture and fetching the threshold values from the threshold textures.

10. The method according to claim 8, wherein, when r is the number of threshold values per each pixel, the output colour values are computed by starting with a start vector each component of which has the value "r", applying the step function r times to combinations of the input colour values with different threshold values, and subtracting the results of the step functions from said start vector.

11. A method of halftoning an image wherein a source file that represents the image in the form of a first pixel array, in which at least one input colour value that is given by a first number of bits is assigned to each pixel, is electronically processed to compute an output file in the form of a second pixel array in which at least one output colour value that is given by a second number of bits, said second number being smaller than the first number, is assigned to each pixel of the second pixel array, wherein the processing is performed in a Graphics Processing Unit (GPU), wherein the method of halftoning the image includes at least one threshold comparison per pixel, and wherein the threshold comparison includes a step of applying the step function to a pair of a colour value and a corresponding threshold value.

12. The method according to claim 11, wherein the step function is a vectorial step function each component of which operates on a different colour value.

13. A method of halftoning an image wherein a source file that represents the image in the form of a first pixel array, in which at least one input colour value that is given by a first number of bits is assigned to each pixel, is electronically processed to compute an output file in the form of a second pixel array in which at least one output colour value that is given by a second number of bits, said second number being smaller than the first number, is assigned to each pixel of the second pixel array, wherein the processing is performed in a Graphics Processing Unit (GPU), wherein the method further comprises converting the colour values from one colour system to another colour system, said step being performed in the GPU, and wherein the colour conversion step includes a step of generating a black colour component by reference to a one-dimensional black generation texture stored in the GPU.

14. The method according to claim 13, wherein the method of halftoning the image includes at least one threshold comparison per pixel.

* * * * *